United States Patent
Kurfiss et al.

(10) Patent No.: US 11,223,314 B2
(45) Date of Patent: Jan. 11, 2022

(54) ELECTRIC MACHINE

(71) Applicant: Robert Bosch GmbH, Stuttgart (DE)

(72) Inventors: Jochen Kurfiss, Lomersheim (DE); Ulrich Vollmer, Weilheim (DE)

(73) Assignee: Robert Bosch GmbH, Stuttgart (DE)

( * ) Notice: Subject to any disclaimer, the term of this patent is extended or adjusted under 35 U.S.C. 154(b) by 48 days.

(21) Appl. No.: 16/626,384

(22) PCT Filed: Jun. 14, 2018

(86) PCT No.: PCT/EP2018/065892
§ 371 (c)(1),
(2) Date: Dec. 24, 2019

(87) PCT Pub. No.: WO2019/015894
PCT Pub. Date: Jan. 24, 2019

(65) Prior Publication Data
US 2020/0136548 A1   Apr. 30, 2020

(30) Foreign Application Priority Data
Jul. 21, 2017   (DE) .................. 10 2017 212 574.8

(51) Int. Cl.
*H02P 1/18*      (2006.01)
*H02P 27/08*     (2006.01)
(Continued)

(52) U.S. Cl.
CPC ........ *H02P 27/08* (2013.01); *H02M 7/53873* (2013.01); *H02P 21/22* (2016.02); *H02P 23/00* (2013.01); *H02P 25/22* (2013.01)

(58) Field of Classification Search
CPC .... H02M 7/53873; H02P 21/22; H02P 23/00; H02P 25/22; H02P 27/08
See application file for complete search history.

(56) References Cited

U.S. PATENT DOCUMENTS

2007/0241699 A1* 10/2007 Osada ................ H02P 21/06
                                                    318/141
2010/0072928 A1*  3/2010 Welchko ............ B60L 50/51
                                                    318/400.13
(Continued)

FOREIGN PATENT DOCUMENTS

DE   10 2005 043 576 A1   3/2007
DE   10 2015 202 693 A1   9/2015
(Continued)

OTHER PUBLICATIONS

International Search Report corresponding to PCT Application No. PCT/EP2018/065892, dated Sep. 17, 2018 (German and English language document) (5 pages).
(Continued)

*Primary Examiner* — Muhammad S Islam
(74) *Attorney, Agent, or Firm* — Maginot, Moore & Beck LLP

(57) ABSTRACT

An electric machine, in particular an electric motor and/or generator, has a stator and a rotor which is designed to be permanently magnetic or to be energized in particular. The machine has at least two sub-machines. Each of the sub-machines has the same number of phases. The machine has a power output stage for each sub-machine, and the machine also has at least one control unit which is connected to the power output stages. The control unit is designed to generate a pulse width-modulated signal for actuating the power output stages. The control unit is designed to generate the PWM signal for the sub-machines such that an ascending or descending side of a PWM pulse for one sub-machine, said side representing a switching time in each case, and a pulse center of a PWM pulse for another sub-machine of the sub-machines are delayed relative to each other.

9 Claims, 4 Drawing Sheets

(51) Int. Cl.
    *H02P 21/22*     (2016.01)
    *H02M 7/5387*     (2007.01)
    *H02P 23/00*     (2016.01)
    *H02P 25/22*     (2006.01)

(56) References Cited

U.S. PATENT DOCUMENTS

2013/0009587 A1*   1/2013   Yabuguchi .............. H02P 27/08
                                                                                         318/561
2016/0365821 A1*   12/2016   Hustedt ................. H02P 27/085

FOREIGN PATENT DOCUMENTS

| JP | 2013-135593 A | 7/2013 |
| JP | 2014-3783 A | 1/2014 |

OTHER PUBLICATIONS

Ye, H. et al., "A Six-Phase Current Reconstruction Scheme for Dual Traction Inverters in Hybrid Electric Vehicles with a Single DC-Link Current Sensor," IEEE Transactions on Vehicular Technology, vol. 63, No. 7, pp. 3085-3093, 2014 (9 pages).

* cited by examiner

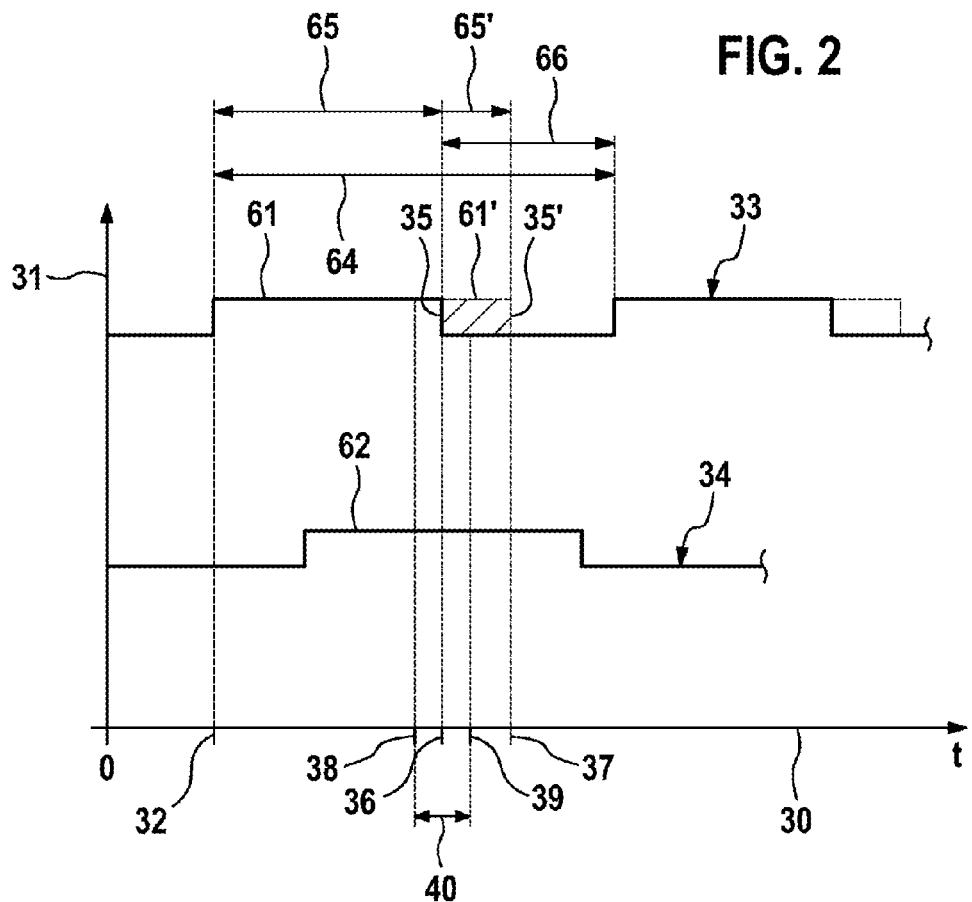
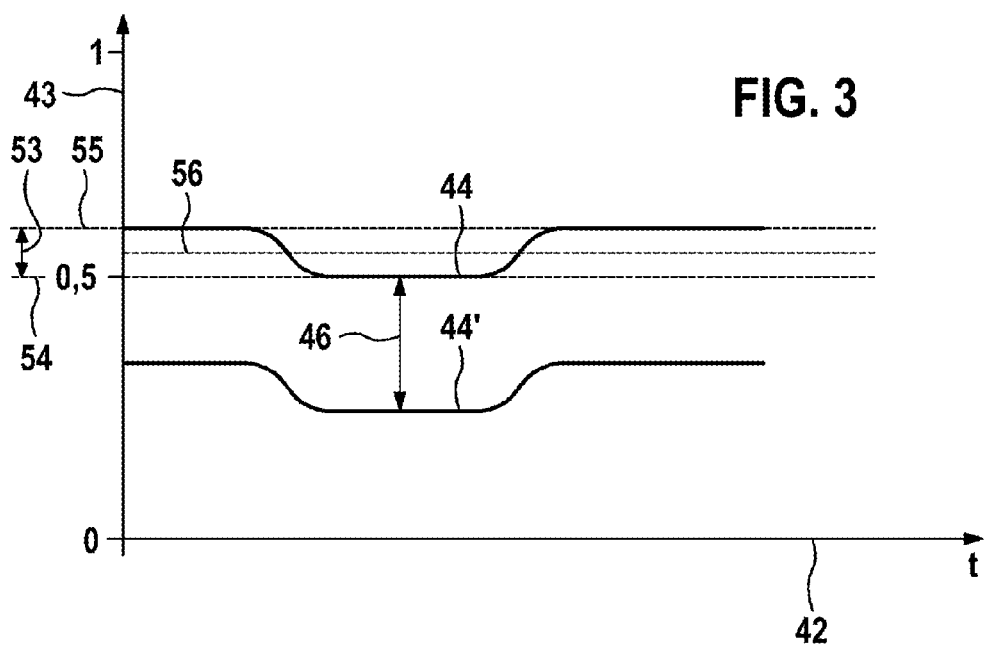

ELECTRIC MACHINE

This application is a 35 U.S.C. § 371 National Stage Application of PCT/EP2018/065892, filed on Jun. 14, 2018, which claims the benefit of priority to Serial No. DE 10 2017 212 574.8, filed on Jul. 21, 2017 in Germany, the disclosures of which are incorporated herein by reference in their entirety.

BACKGROUND

The disclosure relates to an electric machine, in particular an electric motor and/or generator. The electric machine comprises a stator and a rotor which is in particular permanently magnetic or may be energized. The machine comprises at least two sub-machines. The sub-machines each comprise the same number of phases. The sub-machines preferably each comprise a part of the stator coils of the stator, and each is designed to create a rotating magnetic field for the rotary movement of the rotor, independently of one another. The machine, in particular the stator, preferably comprises at least one, at least two, at least three or only one stator coil for each phase of a sub-machine.

A method for the operation of an electric machine is known from DE 10 2005 043 576 A1 that comprises at least two electrically separated stator windings, wherein the first stator winding is fed via a first partial converter and the second stator winding is fed via a second partial converter. The partial converters are controlled by offset clocked signals.

SUMMARY

According to the disclosure, the machine comprises a power output stage for each sub-machine. The machine also comprises at least one control unit which is connected to the power output stages. The control unit is designed to generate a pulse-width modulated signal for driving the power output stages. The control unit is also designed to generate the PWM signal for the sub-machines in such a way that a falling or rising edge, representing in each case a switching time point, of a PWM pulse for a sub-machine and a pulse middle of a PWM pulse for a further sub-machine of the sub-machines are offset in time with respect to one another.

It is namely recognized that a current acquisition of a stator coil current which in a favorable manner can take place at the time point of a pulse middle of a PWM pulse can be disturbed in the event of a rising or falling edge of a PWM pulse that is generated for switching a stator coil of the stator. The stator coil that is subjected by the power output stage to a switched edge controlled by a PWM pulse generates electromagnetic fields which can disturb the current acquisition, in particular the current measurement, of the stator coil current of a further stator coil. The disturbance can in particular occur when the pulse patterns generated for the sub-machines, also referred to above as the PWM signal, are different from one another, or the PWM drive of the sub-machines takes place with a mutual time offset.

Preferably each sub-machine, which preferably comprises a part of the stator coils of the stator, is designed to generate a magnetic field for the rotary movement of the rotor, in particular for a full rotation of the rotor. The sub-machines are preferably each electrically connected to the same intermediate circuit, and can be supplied with energy from the same intermediate circuit. The control unit is preferably designed to drive the sub-machines with a mutual phase offset—preferably by subjecting the power output stage to a PWM signal. As a result, an intermediate circuit capacitor connected to the intermediate circuit is advantageously discharged. A phase offset between drive patterns of the sub-machines preferably amounts to between 20 and 30 percent of a PWM period, in particular preferably 25 percent of a PWM period. As a result the intermediate circuit capacitor can supply the sub-machines with current in alternation.

In one preferred form of embodiment, the machine comprises at least one current sensor connected to the control unit. The current sensor is designed to acquire the current of at least one phase, or of all the phases of the sub-machine. The control unit is designed to acquire the phase current of at least one phase of the sub-machine during a pulse middle of a PWM pulse, wherein the switching time points of the PWM pulse are offset in time with respect to the pulse middle and thus to the acquisition time point of the current. The machine preferably comprises at least one current sensor for each sub-machine. The current sensor can, for example, be designed as a shunt resistor. By means of the current sensor the phase current of a phase of a sub-machine can advantageously be acquired, and a current signal representing the phase current can be generated. The control unit is preferably connected to the current sensor on the input side, and can advantageously receive the current signal as a control parameter or regulation parameter for driving the power output stage by the control unit.

In one preferred form of embodiment, the control unit is designed to modify a duty ratio between a PWM pulse duration and a pulse pause duration of a PWM period for all phases of a sub-machine, in particular equally, and thus to generate a time offset between the pulse edges of the sub-machine and the pulse middle of the PWM pulse for the at least one further sub-machine. A voltage offset of a voltage vector of the sub-machine is generated by the simultaneous modification of the duration of the PWM pulse for all stator coils of a sub-machine, which, however, advantageously has no influence on the mutual potential difference between the phases of the sub-machine.

In one preferred form of embodiment, the control unit is designed to modify a pulse duration of the high-side pulse which is generated by a high-side semiconductor switch of the power output stage and a low-side pulse which is generated by a low-side semiconductor switch of the same power output stage in alternation with one another. The additional power loss in the power output stage caused by the pulse extension can thus be distributed in particular equally between the high-side semiconductor switches and the low-side semiconductor switches.

In one preferred form of embodiment, the control unit is designed to modify the duty ratio for one phase to an upper limit of an in particular lower drive range. A negative voltage value of the resulting voltage vector can in this way advantageously be avoided in the case of a subtraction of a predetermined period duration from a PWM pulse duration of a PWM pulse.

In one preferred form of embodiment the control unit is designed to generate a current acquisition interval and to acquire the current during the current acquisition interval. The control unit is preferably further designed to modify, in particular to enlarge or reduce, the duty ratio in such a way that the in particular rising or falling edges coincide with the beginning or an end time point of the current acquisition interval, or lie outside the current acquisition interval. The operating voltage that is to be generated by the control unit by means of the PWM modulation for operating the power output stage can thus advantageously extend to the limit of the current acquisition interval, so that a control of the operating voltage to be applied to the power output stage, in particular one phase of the power output stage, can advantageously take place within a voltage interval that extends as far as an in particular non-allowed voltage interval, which is determined by a time window of the voltage acquisition interval. The operating voltage for operating the power output stage that is to be generated by the control unit by means of the PWM modulation here corresponds to a drive of the machine determined by a duty ratio of the PWM modulation.

In one preferred embodiment, the control unit comprises a pulse-width modulator which is designed to modify the duty ratio for at least one or a plurality of PWM periods. The control unit can thus by means of the pulse-width modulator advantageously set the voltage to be applied to a stator coil by means of the modification of the duty ratio.

The disclosure also relates to a method for driving an electric machine with at least two sub-machines. The sub-machines each comprise an equal number of stator coils. In the method, pulse-width modulated pulse patterns are generated for driving the stator coils, wherein a current flowing through at least one of the stator coils is acquired in the time range of a pulse middle. In the method, a duty ratio of a pulse period for at least one other sub-machine is modified, in particular lengthened or shortened, in such a way that a pulse beginning and/or a pulse end of a PWM pulse takes place offset in time from the current acquisition, in particular from the pulse middle.

In one preferred variant of the method, the current is acquired within a current acquisition interval that includes the time point of the pulse middle. The current acquisition in the range of the pulse middle can advantageously be controlled by a PWM pulse, preferably generated centered on the middle by a PWM clock pulse, generated by the pulse-width modulator. For example, the current acquisition can in every PWM period, every second, third or fourth PWM period, or only in non-immediately sequential PWM periods that enclose a predetermined number of PWM periods between them, so that no current acquisition takes place in the included PWM periods.

A duty ratio of the other sub-machine preferably amounts to half, and thus 50 percent, of a full drive, wherein the PWM pulses for the other sub-machine are lengthened or shortened. With this drive value a pulse middle of a control pulse for the further sub-machine coincides with a pulse edge of a control pulse for the sub-machine. During a current acquisition of a current of the further sub-machine at the time point or in the time range of the pulse middle, the current acquisition can be disturbed by the edge of the control pulse of the other sub-machine. A phase offset of the PWM drive between the two sub-machines amounts for this purpose to for example 25 percent of a PWM period.

A range of the duty ratio of the sub-machine that is to be avoided further preferably amounts to between 50 and 60 percent, and/or between zero and 10 percent of the full drive. In this way the current acquisition at the sub-machine can advantageously be performed without disturbance. A different range of the drive to be avoided results with a different phase offset of the PWM drive between the sub-machines.

BRIEF DESCRIPTION OF THE DRAWINGS

The disclosure will now be described below with reference to figures and further exemplary embodiments. Further advantageous variant embodiments result from the features described in the figures.

FIG. 2 shows a diagram in which control pulses for driving two sub-machines that are different from one another are illustrated;

FIG. 3 shows a diagram in which an offset shift of a voltage curve at a stator coil resulting from a lengthening of a pulse duration is illustrated;

DETAILED DESCRIPTION

Figure 1:
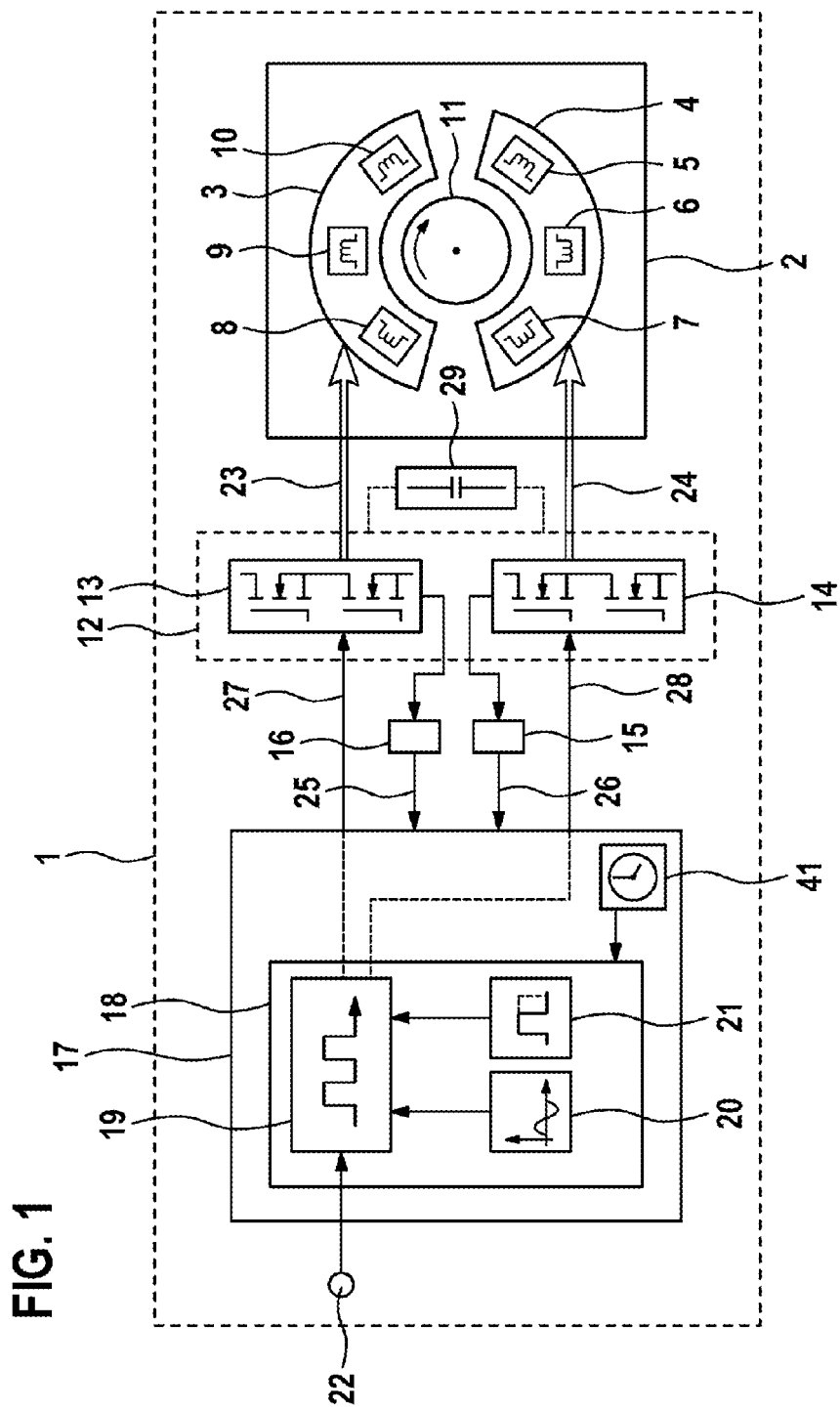
FIG. 1 shows an exemplary embodiment of an electric machine that is designed to modify a pulse duration of a PWM pulse depending on a current acquisition of a drive current of a further sub-machine in such a way that the current acquisition cannot be disturbed by a switching edge of the PWM pulse.

FIG. 1 shows—schematically—an exemplary embodiment of an electric machine 1. The electric machine 1 comprises a stator 2. The stator 2 comprises, in this exemplary embodiment, two sub-machines, each of which is of three-phase design, and has three stator coils for this purpose. In this exemplary embodiment one sub-machine 3 comprises the stator coils 8, 9 and 10. A further sub-machine 4 of the sub-machines comprises the stator coils 5, 6 and 7. The machine 1 also comprises a rotor 11 that is, for example, designed as a permanent magnet. The machine 1 also comprises an output stage 12 which, in this exemplary embodiment, is formed of two partial output stages 13 and 14. Each of the partial output stages 13 and 14 comprises a B6-bridge or three H-bridges. One H-bridge comprises two semiconductor half-bridges, whose output terminals can each be connected to a terminal of a stator coil. The partial output stage 13 is connected on the output side to the sub-machine 3 via an electrical connection 23. The partial output stage 14 is connected on the output side to the sub-machine 4 via an electrical connection 24. The partial output stage 13 is designed to energize the stator coils 8, 9 and 10 to generate a rotary magnetic field for the rotary movement of the rotor 11. The sub-machine 14 is designed to energize the stator coils 5, 6 and 7 to generate a rotary magnetic field for the rotary movement of the rotor 11. The partial output stages 13 and 14, together with the respective sub-machines 3 or 4, can independently excite the rotor 11 into rotary motion. In this way, the machine 1 comprises two mutually independent sub-machines which can, in normal operation, jointly move the rotor 11 or, in the event of a defect of one sub-machine the sub-machine that still remains can continue to move the rotor 11.

The machine 1 also comprises a control unit 17. The control unit 17 is connected on the output side via a connecting line 27 to the output stage 12, and is connected there with the partial output stage 13, and is designed to operate the sub-machine 3 via the connecting line 27 and to generate a control signal, in particular a pulse pattern for this purpose, and to send this to the partial output stage 13. The control unit 17 is connected on the output side via a connecting line 28 to the partial output stage 14, and is designed to drive the partial output stage 14, in particular control terminals of the partial output stage 14, to energize the sub-machine 4. The machine 1 also comprises a current sensor 16 for the acquisition of a current of the partial output stage 13, and a current sensor 15 for the acquisition of a current of the partial output stage 14. The current sensors 15 and 16 are, for example, formed by a shunt resistor. The partial output stages 13 and 14 can—other than as illustrated in FIG. 1—also be connected by means of a common current sensor. For this purpose a ground line of the partial output stages 13 and 14 can each be brought together, and the combined ground line brought via the common shunt resistor to a ground terminal of the machine 1.

In this exemplary embodiment, the control unit 17 is designed to drive the sub-machines 3 and 4 with a mutual phase offset. In this way an intermediate circuit capacitor 29 used jointly by the partial output stages 13 and 14 can be discharged. The current sensor 16 is connected on the output side via a connecting line 25 to the control unit 17. The current sensor 15 is connected on the output side via a connecting line 26 to the control unit 17. The current sensors 16 and 15 are each designed to acquire a current flowing in the respective partial output stage 13 or 14, and to generate a current signal representing the current and to send it on the output side to the control unit 17.

The control unit 17 comprises a pulse pattern generator 18. The pulse pattern generator 18 is designed to generate pulse-width modulated control signals for driving the power output stage 12, in particular control terminals of the power output stage 12, and to output these on the output side. The pulse pattern generator 18 comprises a pulse-width modulator 19 for this purpose. The pulse-width modulator 19 comprises an input 22 and is designed to generate a duty ratio between a pulse duration and a pulse pause duration depending on a control signal received at the input 22, in particular an amplitude signal, and to generate the control pulses for switching the semiconductor switches of the power output stage 12 on and off in accordance with the duty ratio.

The pulse-width modulator 19, also referred to below as the PWM modulator, is connected on the input side to a drive pattern generator 20. The drive pattern generator in this exemplary embodiment is designed to generate a drive signal for each phase, and thus for each stator coil of the sub-machines corresponding to each of the phases. The drive signal represents, for example, a sinusoidal waveform or, in addition, a harmonic, preferably the third harmonic, corresponding to the sinusoidal waveform as the fundamental oscillation.

The control unit 17 is designed to acquire the current signal generated by the current sensors 15 and 16 at least at one current acquisition time point, or within a current acquisition interval that lies in the temporal range or at the time point of one half of the control pulse duration of a control pulse. The control unit 17 can thus acquire the current flowing in the power output stage, in particular in the partial output stages 13 and 14 at the time point of a pulse middle of the control pulse generated by the PWM modulator 19. The PWM modulator 19 is, for example, designed to generate the control pulses centered at the middle within a pulse period. The current acquisition takes place for example centered at the middle with respect to the control pulse generation. The control unit 17, in particular the PWM modulator 19, is designed to drive the sub-machines 3 and 4 with a phase offset with respect to one another. A phase offset between the pulse patterns for the sub-machines 3 and 4 amounts, for example, to 25 percent of a pulse period duration. The control unit 17 is designed to modify, in particular to lengthen or to shorten, the control pulse duration of the control pulses for the sub-machine at least for the duration of the current acquisition of the drive current at least for one period clock or a plurality of period clocks in the event of a switching edge of a control pulse for a sub-machine wherein the switching time point of the switching edge falls within a current acquisition interval of a current acquisition of the further or the same sub-machine.

The control unit 17, in this exemplary embodiment the pulse pattern generator 18, comprises an adding unit 21 for this purpose which is designed, depending on a coincidence of a switching edge within the current acquisition interval, to lengthen the control pulse duration of the control pulses for the sub-machine and to generate for this purpose a lengthened control pulse in such a way that the switching edge lies outside the current acquisition interval. The pulse pattern generator 18 is connected on the input side to a timer 41 and is designed to receive a clock signal representing a clock generated by the timer 41 and to generate the PWM signal depending on the clock signal. The timer 41 is, for example, formed by a quartz oscillator.

FIG. 2 shows a diagram in which two pulse pattern signals, different from one another for two stator coils different from one another of sub-machines different from one another are illustrated schematically. The diagram comprises a time axis 30 and an amplitude axis 31. The curve 33 represents a pulse-width modulated control signal for driving the partial output stage 13 which, for example, brings about an energization of the stator coil 8 of the sub-machine 3.

The pulse pattern signal, represented by the curve 33, comprises a control pulse 61 which starts at a time point 32 and ends at a later time point 36. The control pulse 61 has a control pulse duration 65 that extends between the time point 32 of the beginning and a time point of the end 36. A pulse pause with a pulse pause duration 66 follows the control pulse 61. A period duration, two, three of a PWM period of the control pulse 61 thus comprises the control pulse duration 65 and the pulse pause duration 66. The ratio between the control pulse duration 65 and the pulse pause duration 66 determines the duty ratio of the PWM modulation.

At its end, the control pulse 61 comprises a falling edge 35. FIG. 2 also shows a pulse-width modulated control signal, represented by a curve 34, which comprises a control pulse 62. The control pulse 62 has its pulse middle at the time point 36. The partial output stage 14 is driven by means of the control pulse 62, and thus by means of the pulse-width modulated control signal represented by the curve 34, and a stator coil of the further sub-machine 4, for example the stator coil 5 in FIG. 1, is thus energized. FIG. 2 also shows a current acquisition interval 40 which includes the time point 36, so that the pulse middle of the control pulse 62 lies within the current acquisition interval 40. In this exemplary embodiment, as a result of the phase shift of the control signals of the sub-machines 3 and 4 illustrated in FIG. 1, the switching edge 35 of the control signal described previously, represented by the curve 33, lies in the current acquisition interval 40, and can disturb the current acquisition by the current sensor 15, and in particular the current signal generated by the current sensor 15 during the current acquisition. FIG. 2 also shows a control pulse 61' lengthened in time, which has a falling edge 35' whose time point 37 lies outside the current acquisition interval 40—being later in this exemplary embodiment. The control pulse 61', which has been lengthened in time, has the lengthened control pulse duration 65'. The current acquisition interval 40 has a lower limit 38 and an upper limit 39. A drive range of the pulse-width modulation for the control pulse 61 which should be avoided at least at the time point of a current acquisition of a current of the further sub-machine during the control pulse generation of the control pulse 61—for example by the pulse-width modulator 19 illustrated in FIG. 1—thus lies between the lower limit 38 and the upper limit 39.

The duty ratios lying within the current acquisition interval 40, and thus the voltage values corresponding to the duty ratios, which develop at the energization of the corresponding stator coil, are barred for the corresponding stator coil by the adding unit 21, which is designed to generate a duty ratio for generating the control pulse 61 in such a way that a rising or a falling edge 35 lies outside the current acquisition interval 40.

FIG. 3 shows—schematically—a diagram with an abscissa 42 that represents the passage of time and an ordinate 43 that represents a signal amplitude. FIG. 3 shows an exemplary voltage curve at a stator coil, respectively averaged, in particular momentarily, over one PWM period, which is generated by the pulse-width modulated signal, represented by the curve 33. The voltage curve, represented by the curve 44, lies within a drive interval 53 which has an upper limit 55, a lower limit 54, and a mean value 56. All the control pulses necessary for the generation of the voltage curve 44, like the control pulse 61 illustrated in FIG. 2, thus fall with the respective falling edge, like the falling edge 35 illustrated in FIG. 2, in the current acquisition interval 40 which corresponds in FIG. 3 to the drive interval 53. In doing so, the drive interval 53 determines a drive range to be avoided in a drive of the machine.

The lengthened control pulse 35' illustrated in FIG. 2 now brings about an offset shift 46 of an offset of the voltage curve, represented by the curve 44. FIG. 3 also shows a curve 44' which represents the curve 44 shifted out of the amplitude range 53 by the offset shift 46, and thus a voltage curve shifted out of the drive range 53. The control pulses for driving the semiconductor switches for a sub-machine, in particular for all the stator coils of the sub-machine, are lengthened or shortened at the same time corresponding to the offset shift 46.

Figure 4:
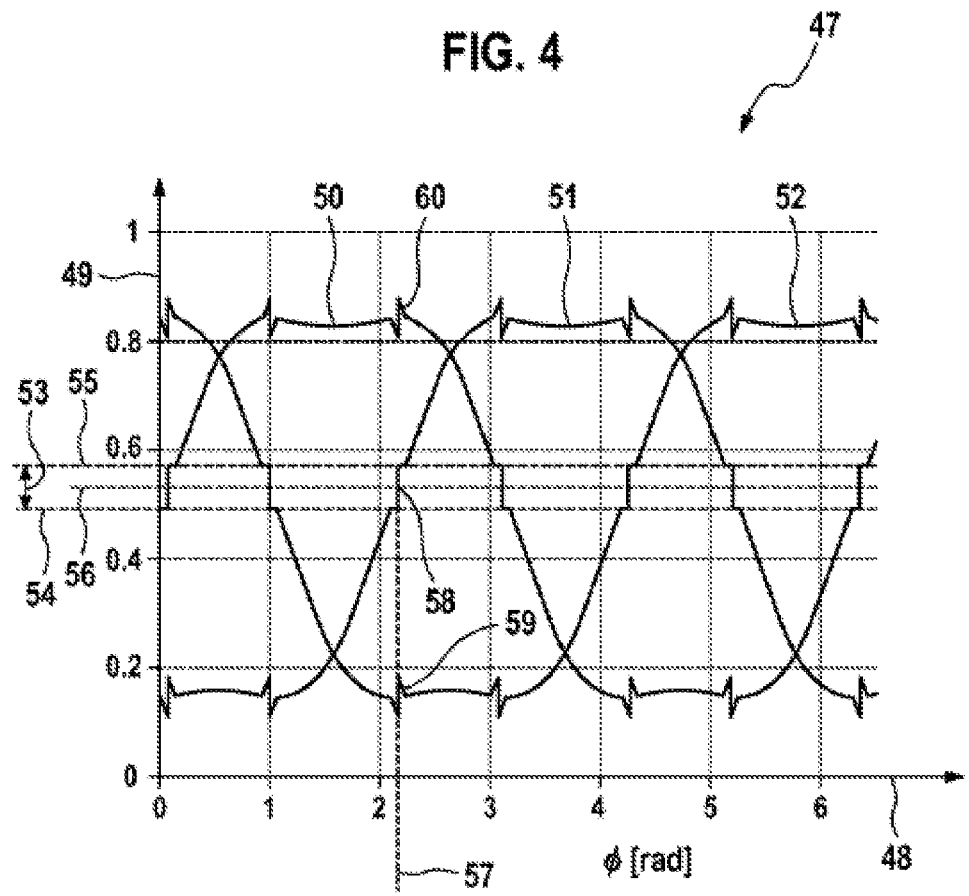
FIG. 4 shows voltage curves at three stator coils of a sub-machine in which an in particular middle drive range in the curve shapes is skipped.

FIG. 4 shows—schematically—a diagram in which a curve 50, a curve 51 and a curve 52 are illustrated. The diagram has a time axis 48 and an amplitude axis 49. The curves 50, 51 and 52 each represent a voltage curve at stator coils of a sub-machine that are different from one another, for example the three stator coils 8, 9 and 10 of the sub-machine 3 in FIG. 1, which curve can be generated when the stator coils 8, 9 and 10 are energized by the partial output stage 13.

The curve 50 corresponds here, for example, to the voltage curve at the stator coil 8, the curve 51 to the voltage curve at the stator coil 9 and the curve 52 to the voltage curve at the stator coil 10 in FIG. 1. FIG. 4 also shows the drive range 53, the mean value 56, the lower limit 54 and the upper limit 55 of the drive range 53.

FIG. 4 also shows a measurement time point 57 at which a current of a further sub-machine, for example the sub-machine 4 in FIG. 1, is acquired. The pulse-width modulator 18 in FIG. 1 is, for example, designed to shorten the control pulses that bring about an energization of the stator coil 9 and which generates the voltage curve at the stator coil 9 represented by the curve 51, in the voltage range of the drive range 53 in an interval between the mean value 56 and the lower limit 54 in such a way that the control pulse duration of the control pulse passes outside the current acquisition interval and thus a voltage generated at the stator coil 9 reaches at most the lower limit 54 of the drive range 53—as far as the time point 57. The time point 57 here corresponds to the mean value 56 of an unmodified voltage curve in the drive range 53. The control pulses which correspond to the drive range between the mean value 56 and the upper limit 55, can be appropriately lengthened by the pulse-width modulator 18 so that the falling edges, like the falling edge 35' in FIG. 2, lie outside the current acquisition interval 40. The drive values that lie between the mean value 56 and the upper limit 55 are thus shifted at least to the upper limit 55 in the current acquisition interval 40. FIG. 4 also shows the simultaneous modification of the control pulse duration for the three stator coils 8, 9 and 10 of the same sub-machine 3.

The voltage curve at the stator coil 9, represented by the curve 50, has an amplitude curve 60 at the time point 57 corresponding to the shortening or lengthening of the control pulse duration. The curve 52, which represents the voltage curve at the stator coil 10, has a corresponding amplitude curve 59 in the range of the time point 57, which is caused by the modification of the control pulse duration. The voltage curve at the stator coil 9, represented by the curve 51, has a stepped form 58 in the range of the current acquisition time point 57.

Figure 5:
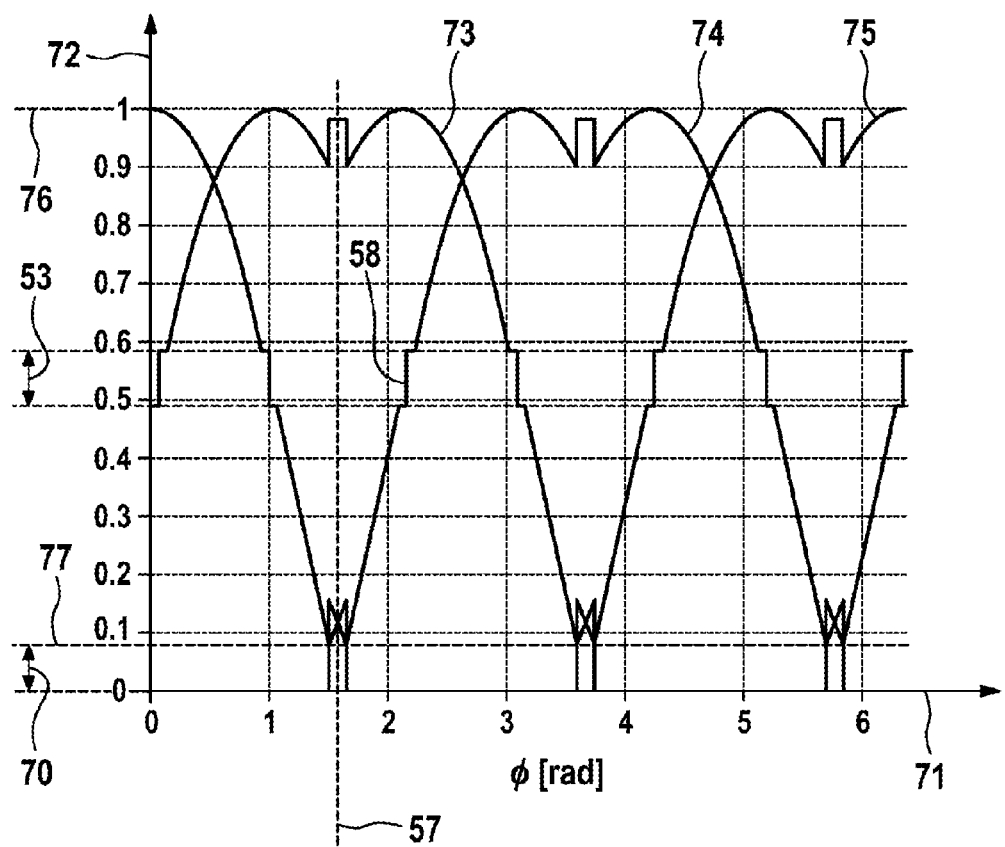
FIG. 5 shows voltage curves at three stator coils of a sub-machine, in which two drive ranges in the curve shapes are skipped.

FIG. 5 shows—schematically—a diagram in which curves 73, 74 and 75 each corresponding to a voltage curve are illustrated. The diagram has a time axis 71 and an amplitude axis 72. The curves 73, 74 and 75 represent, in this exemplary embodiment, a full drive of the sub-machine 3 illustrated in FIG. 1. The diagram in FIG. 5 also shows a further drive range 70 which extends between a smallest possible drive value, in this exemplary embodiment a zero value of the drive range, and a drive value that is smaller than a maximum drive value 76, wherein the maximum drive value 76 corresponds to the full drive of the sub-machine. The smallest value explained previously here corresponds to an upper limit 77 of the previously mentioned drive range 70. The drive range 70 in this exemplary embodiment is caused by very short control pulses for energizing the sub-machine 3 itself.

The pulse-width modulator 18 is designed in this exemplary embodiment to lengthen the control pulse duration of control pulses that fall in the drive range 70, also referred to below as the lower drive range, in such a way that the lengthened control pulses have a control pulse duration that corresponds to the upper limit 77 of the drive range 70. A measuring time point 57 for the current acquisition of a current at the same sub-machine 3 in FIG. 1 can take place through the lengthening of the control pulses for the sub-machine 3 thus also at a time point corresponding to the upper limit 77 at which time point the voltage curves, represented by the curves 73 and 74, would each enter the lower range 70. The voltage curves mentioned above, which lie in the lower range 70 or in the previously mentioned drive range 53 are specified by the drive pattern generated by the drive pattern generator 20. The voltage curves represented by the curves 73, 74 and 75 thus deviate from the signal form specified by the drive pattern generator as a result of the shortened or lengthened control pulses. The deviation caused in this way is, however, advantageously very small, since advantageously a pulse modulation frequency that determines a pulse period duration of the pulse-width modulation is selected to be large enough that the modification to the control pulse duration can be done in suitably small steps. Furthermore, the drive range 53, or additionally the lower drive range 70, is advantageously in each case less than one tenth of the full drive of the machine, represented by the maximum drive value 76.

The invention claimed is:

1. An electric machine comprising:
a stator;

a rotor;

at least two sub-machines, each of the at least two sub-machines having a same number of phases, wherein each of the at least two sub-machines comprises a part of stator coils of the start and are configured to generate a magnetic field for rotating the rotor;

at least two power output stages, each of the at least two power output stages corresponding to a respective one of the at least two sub-machines;

at least one control unit connected to the at least two power output stages and configured to generate at least one PWM signal to drive the at least two power output stages, the at least one control unit being configured to generate the at least one PWM signal such that one of falling edges and a rising edges, representing in each case switching time points, of first PWM pulses of the at least one PWM signal for a first sub-machine of the at least two sub-machines and pulse middles of second PWM pulses of the at least one PWM signal for a second sub-machine of the at least two sub-machines are offset in time with respect to one another; and at least one current sensor connected to the at least one control unit and configured to acquire a phase current of at least one phase of the at least two sub-machines, wherein the at least one control unit is configured to acquire the phase current of the at least one phase of the second sub-machine during respective pulse middles of the second PWM pulses, and wherein, in event of a rising or falling edge of one of the first PWM pulses being timed to occur during a pulse middle of one of the second PWM pulses, the switching time point for the rising or falling edge is offset from the pulse middle of the one of the second PWM pulses.

2. The electric machine as claimed in claim 1, wherein the at least one control unit is configured to modify a duty ratio between a PWM pulse duration and a pulse pause duration of a PWM period for all phases of the at least two sub-machines equally, and thus to generate a time offset between the one of the falling edges and rising edges of the first PWM pulses for the first sub-machine and the pulse middles of the second PWM pulses for the second sub-machine.

3. The electric machine as claimed in claim 1, wherein the at least one control unit is configured to modify a pulse duration of a high-side pulse and of a low-side pulse in alternation with one another.

4. The electric machine as claimed in claim 1, wherein the at least one control unit is configured to modify a duty ratio for one phase to an upper limit of a lower drive range.

5. The electric machine as claimed in claim 1, wherein the at least one control unit is configured to generate a current acquisition interval, acquire a current during the current acquisition interval, and modify a duty ratio such that the one of the rising edges and falling edges of the first PWM pulses one of (i) coincide with one of a beginning time point and an end time point of the current acquisition interval and (ii) lie outside the current acquisition interval.

6. The electric machine as claimed in claim 1, wherein the at least one control unit includes a pulse-width modulator configured to modify duty ratio for at least one PWM period.

7. A method for driving an electric machine including at least two sub-machines, each having an equal number of stator coils, the method comprising:

generating pulse-width modulated pulse patterns to drive the stator coils of the at least two sub-machines, acquiring a current flowing through at least one of the stator coils of the at least two sub-machines in a time range of a pulse middle; and in event of at least one of a pulse beginning and a pulse end of a PWM pulse of a first sub-machine of the at least two sub-machines being timed to occur during a pulse middle of a PWM pulse of a second sub-machine of the at least two sub-machines, modifying a duty ratio of a PWM period for the first sub-machine of the at least two sub-machines such that the at least one of the pulse beginning and the pulse end being timed to occur during the pulse middle of the PWM pulse of the second sub-machine takes place offset in time from the pulse middle.

8. The method as claimed in claim 7, the acquiring the current further comprising:

acquiring the current within a current acquisition interval that includes a time point of the pulse middle.

9. The method as claimed in claim 7, wherein a duty ratio of a second sub-machine of the at least two sub-machines amounts to half of a full drive of the electric machine.

* * * * *